Oct. 23, 1956  M. H. EMRICK  2,767,991
TAP COLLETS
Filed Aug. 23, 1954
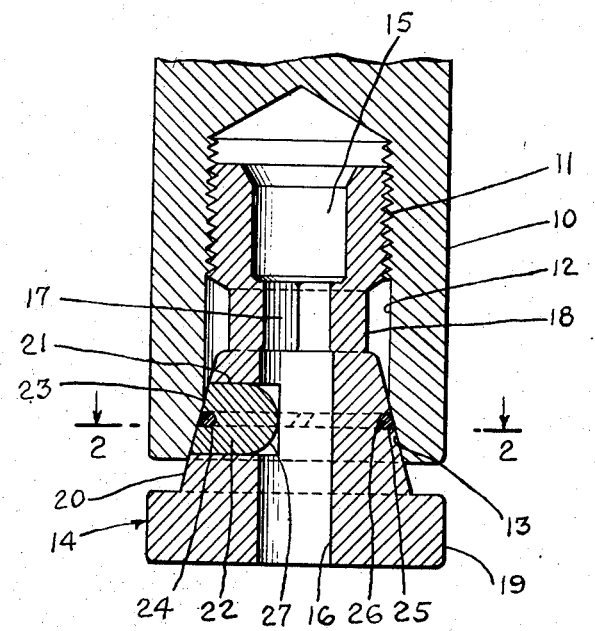
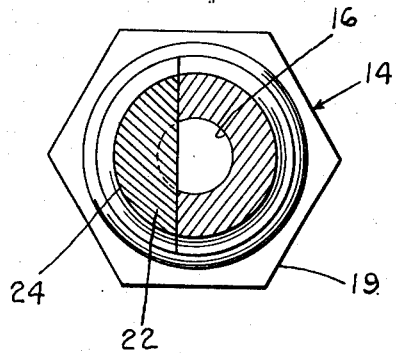
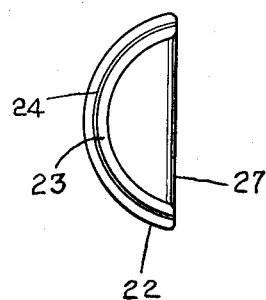
INVENTOR.
MELVIN H. EMRICK
BY
ATTORNEY.

United States Patent Office 2,767,991
Patented Oct. 23, 1956

2,767,991

TAP COLLETS

Melvin H. Emrick, Manhasset, N. Y.

Application August 23, 1954, Serial No. 451,365

7 Claims. (Cl. 279—80)

This invention relates to what are generally referred to as tap collets used in conjunction with tapping machines for support of the tap or tool in connection therewith. More particularly, the invention deals with a collet structure employing a supplemental keying means for keying a tool in the collet in providing a strong and durable coupling between the tool and collet.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through the lower portion of a chuck showing one of my improved collets coupled therewith.

Fig. 2 is a section on the line 2—2 of Fig. 1 showing only the collet structure; and Fig. 3 is a plan view of the key detached.

In Fig. 1 of the drawing, 10 represents the lower portion of a chuck body having a threaded bore 11, outwardly of which is a large diameter bore 12, the lower end of which has a tapered seat 13. At 14 I have shown one of my improved collets, comprising a tubular body, having a short large diameter bore 15 at its inner end, a long smaller diameter tool receiving bore 16 at the other end, these bores being joined by a square or other angle key bore 17 to receive the inner correspondingly formed end of the tool. The tool is omitted, as it is quite apparent, from the disclosure of the collet structure later described, that two definite means are provided for keying a tool in the bores 16 and 17.

Around the square or angular bore 17 is a reduced collar portion 18, which joins an enlarged outer hexagon head 19 in a tapered or substantially conical body portion 20, which fits in the tapered seat 13 in definitely alining the collet in the body 10. The body portion 20 has, at one side, a key recess 21, in which a key element 22 is mounted. The key element has an outer bevelled surface 23, which registers with the outer surface of the conical body 20 and this surface is grooved, as seen at 24, to receive a split spring ring 25, which also fits in an alined groove 26 in the body 20. The key element 22 is retained in operative position by engagement with the surface 23 of the tapered seat 13.

The inner end of the key element 22 is rounded, as seen at 27, to fit in a correspondingly formed recess to fit in the tool, which is not shown. The key element 22 keys the tool against displacement from the collet; whereas, the tool is definitely keyed to the collet in engaging the angular key bore 17. This construction provides an assemblage for quickly and easily coupling and uncoupling a tool with the chuck body 10 by simply applying a wrench or other tool to the hexagon head 19 and, whenever desired, the spring ring 25 can be removed to free the key element 22 for disengagement of the tool, as will be apparent.

Having fully described my invention, what I claim as new and desire to secure by Letters Patent is:

1. A tool chuck, comprising a chuck body having an internally threaded bore disposed within end limits of the lower portion of said body, the bore at the end of the body having a tapered seat, a collet detachably mounted with the chuck body, said collet being tubular in form and having a threaded end engaging the threaded bore of said body, the other end portion of the collet being conical in form and joining the threaded end in a reduced collar, an enlarged head at the second named end of the collet disposed outwardly of the lower portion of said body, the conical portion of said collet fitting in said tapered seat, said conical portion having a key recess across one side portion thereof and opening outwardly through the conical portion, said conical portion having a bore, a key element arranged in said recess and extending into said bore of said conical portion, said key element and the conical portion of said collet having alined circumferential grooves, and a spring ring mounted in said grooves retaining the key element in operative position within the bore of said collet.

2. A tool chuck, comprising a chuck body having an internally threaded bore disposed within end limits of the lower portion of said body, the bore at the end of the body having a tapered seat, a collet detachably mounted with the chuck body, said collet being tubular in form and having a threaded end engaging the threaded bore of said body, the other end portion of the collet being conical in form and joining the threaded end in a reduced collar, an enlarged head at the second named end of the collet disposed outwardly of the lower portion of said body, the conical portion of said collet fitting in said tapered seat, said conical portion having a key recess across one side portion thereof and opening outwardly through the conical portion, said conical portion having a bore, a key element arranged in said recess and extending into said bore of said conical portion, said key element and the conical portion of said collet having alined circumferential grooves, a spring ring mounted in said grooves retaining the key element in operative position within the bore of said collet, and said key element having an outer tapered surface in alinement with the surface of the conical portion of said collet and engaging said tapered seat.

3. A tool chuck, comprising a chuck body having an internally threaded bore disposed within end limits of the lower portion of said body, the bore at the end of the body having a tapered seat, a collet detachably mounted with the chuck body, said collet being tubular in form and having a threaded end engaging the threaded bore of said body, the other end portion of the collet being conical in form and joining the threaded end in a reduced collar, an enlarged head at the second named end of the collet disposed outwardly of the lower portion of said body, the conical portion of said collet fitting in said tapered seat, said conical portion having a key recess across one side portion thereof and opening outwardly through the conical portion, said conical portion having a bore, a key element arranged in said recess and extending into said bore of said conical portion, said key element and the conical portion of said collet having alined circumferential grooves, a spring ring mounted in said grooves retaining the key element in operative position within the bore of said collet, said key element having an outer tapered surface in alinement with the surface of the conical portion of said collet and engaging said tapered seat, and the neck portion of said collet having an angular bore for keying a tool shank in said collet.

4. A tool chuck, comprising a chuck body having an internally threaded bore disposed within end limits of the lower portion of said body, the bore at the end of the body having a tapered seat, a collet detachably mounted with the chuck body, said collet being tubular in form and having a threaded end engaging the threaded bore of said body, the other end portion of the collet being conical in form and joining the threaded end in a reduced collar, an enlarged head at the second named end of the collet disposed outwardly of the lower portion of said body, the conical portion of said collet fitting in said tapered seat, said conical portion having a key recess across one side portion thereof and opening outwardly through the conical portion, said conical portion having a bore, a key element arranged in said recess and extending into said bore of said conical portion, said key element and the conical portion of said collet having alined circumferential grooves, a spring ring mounted in said grooves retaining the key element in operative position within the bore of said collet, said key element having an outer tapered surface in alinement with the surface of the conical portion of said collet and engaging said tapered seat, the neck portion of said collet having an angular bore for keying a tool shank in said collet, and the head of said collet being of hexagon form.

5. A tool chuck of the class described, comprising a chuck body having a tapered outer bore and threaded inner bore, a collet detachable with said body and having a threaded end engaging the threaded bore of said body, a conical portion fitting within the tapered bore of said body, an angular head outwardly of the conical portion and beyond said body, said collet having a plain bore opening through the head end thereof, the inner end of said bore having an angular key bore for keying a tool against rotation in the collet, and a key element yieldably supported in the conical portion of the collet and extending into the plain bore of said collet to key a tool against axial displacement from said plain bore.

6. A tool chuck of the class described, comprising a chuck body having a tapered outer bore and threaded inner bore, a collet detachable with said body and having a threaded end engaging the threaded bore of said body, a conical portion fitting within the tapered bore of said body, an angular head outwardly of the conical portion and beyond said body, said collet having a plain bore opening through the head end thereof, the inner end of said bore having an angular key bore for keying a tool against rotation in the collet, a key element yieldably supported in the conical portion of the collet and extending into the plain bore of said collet to key a tool against axial displacement from said plain bore, and said key element having a bevelled surface normally in alinement with the surface of said conical portion and seating in said tapered bore.

7. A collet for tool chucks of the character described, comprising an elongated tubular member, having an externally threaded end, a head end, an inwardly extending conical portion adjacent the head end and joining said threaded end in a reduced collar, the bore of said collar being angular in cross-sectional form, the conical portion of the collet having a key receiving recess, a key element arranged in said recess, and tensional means engaging the key element and the conical portion of the collet to normally retain the key element within peripheral boundaries of said conical portion.

References Cited in the file of this patent

UNITED STATES PATENTS

| | | |
|---|---|---|
| 47,554 | Lecky | May 2, 1865 |
| 600,808 | Sinclair | Mar. 15, 1898 |
| 1,862,337 | Emrick | June 7, 1932 |
| 2,135,861 | Thompson | Nov. 8, 1938 |
| 2,612,377 | Edens | Sept. 30, 1952 |